(12) United States Patent
Shan

(10) Patent No.: US 6,839,184 B1
(45) Date of Patent: Jan. 4, 2005

(54) ZOOM LENS ASSEMBLY

(75) Inventor: Chen Chun Shan, Siansi (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 10/684,175

(22) Filed: Oct. 10, 2003

(51) Int. Cl.$^7$ ............................................. G02B 15/14
(52) U.S. Cl. ........................................ 359/689; 359/680
(58) Field of Search ................................ 359/689, 680

(56) References Cited

U.S. PATENT DOCUMENTS

| | | | | | |
|---|---|---|---|---|---|
| 6,124,984 | A | * | 9/2000 | Shibayama et al. | 359/689 |
| 6,671,103 | B2 | * | 12/2003 | Itoh | 359/689 |
| 2003/0133201 | A1 | * | 7/2003 | Nanba et al. | 359/689 |
| 2003/0189762 | A1 | * | 10/2003 | Mihara et al. | 359/680 |

* cited by examiner

*Primary Examiner*—Georgia Epps
*Assistant Examiner*—M. Hasan
(74) *Attorney, Agent, or Firm*—Charles E. Baxley

(57) ABSTRACT

A lens assembly includes a first group of lens having negative power, a second group of lens having positive power, and a third group of lens having positive power arranged in sequence from an object side. A gap between the first group of lens and the second group of lens is reduced and a gap between the second group of lens and the third group of lens is widened when wide mode changed to Tele mode. The first group of lens has a negative meniscus lens with a convex surface facing the object side and a positive meniscus lens with a convex surface facing the object side. The second group of lens has a positive glued-lenses and a negative meniscus lens with a convex surface facing the object side. The third group of lens is a bi-convex lens.

3 Claims, 10 Drawing Sheets

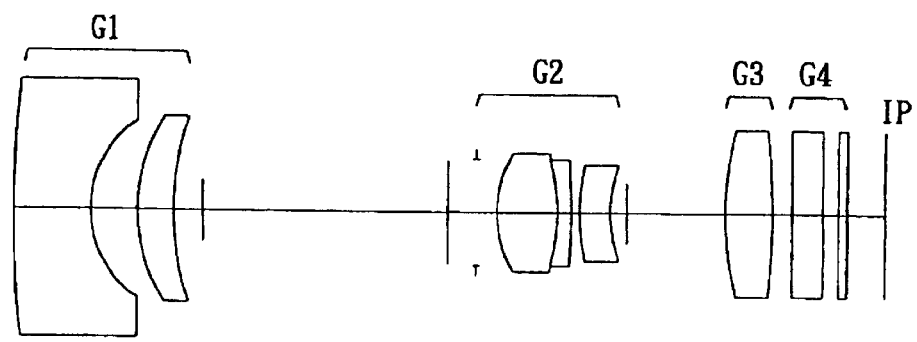
F I G. 1
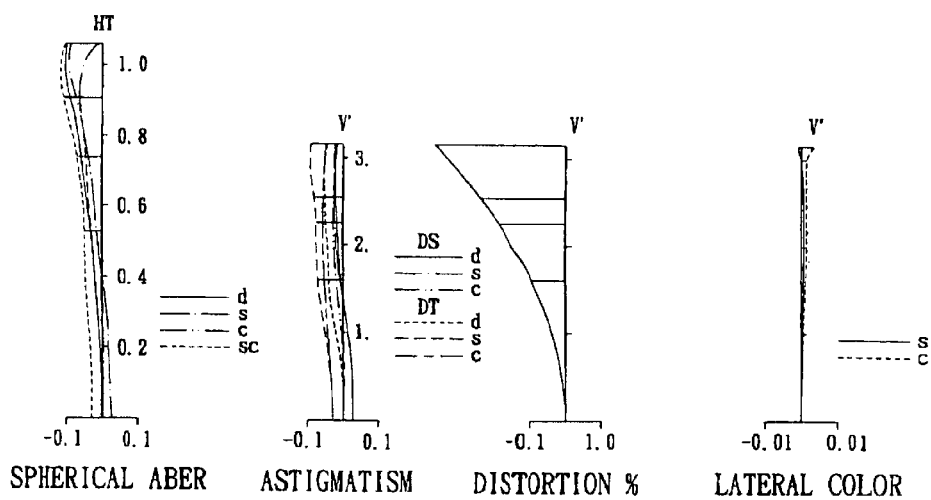
F I G. 2

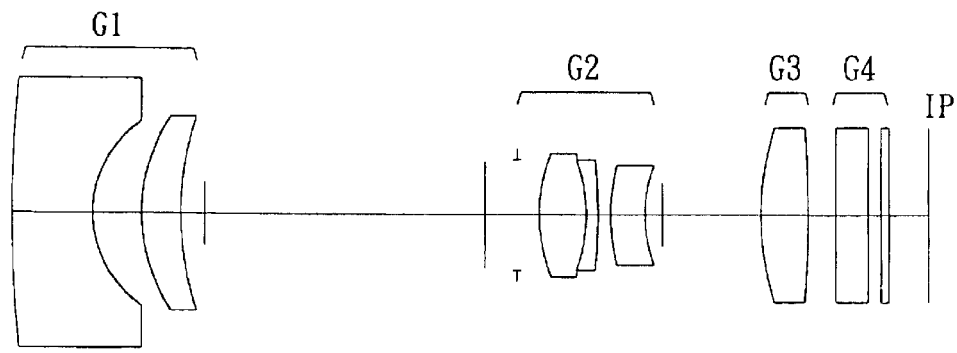
F I G. 5
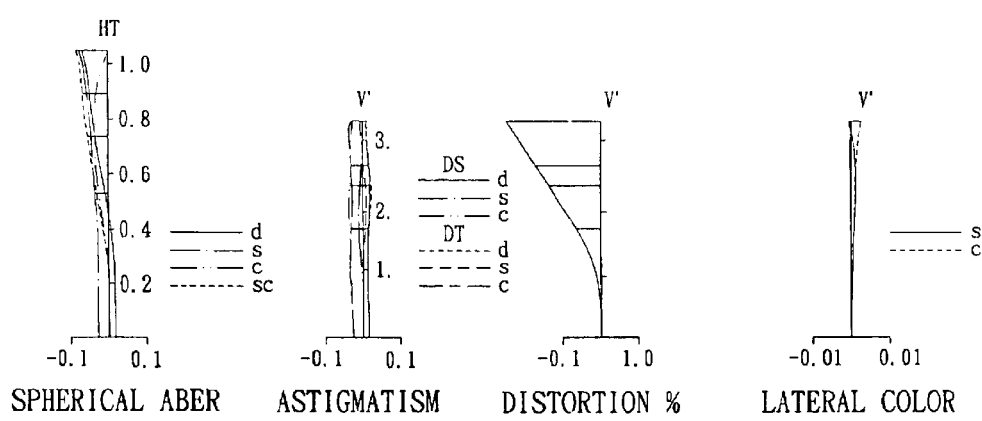
F I G. 6

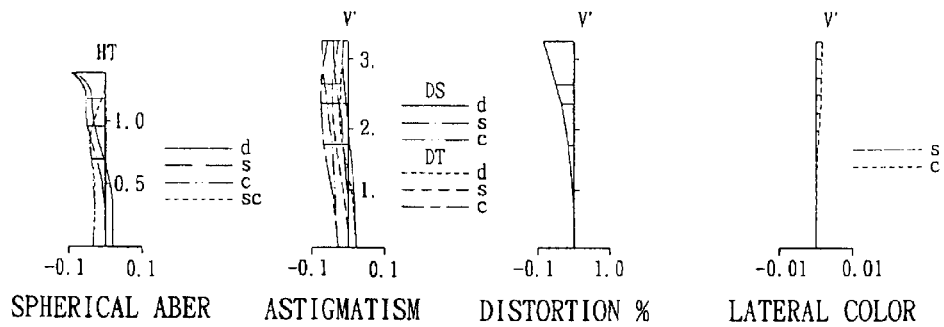
F I G. 7
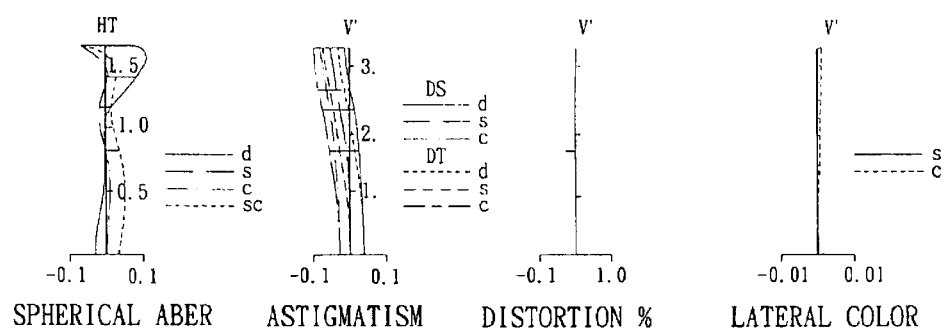
F I G. 8

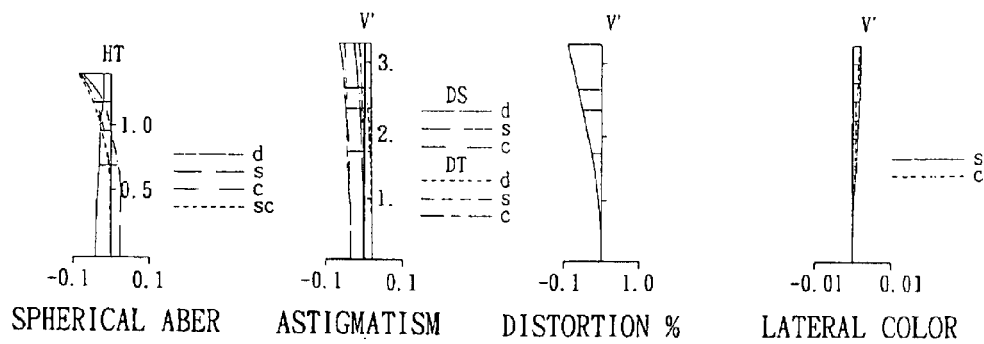
F I G. 15
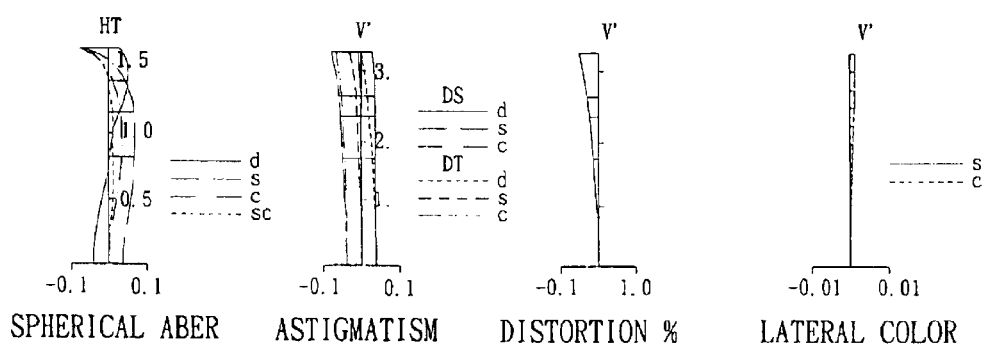
F I G. 16

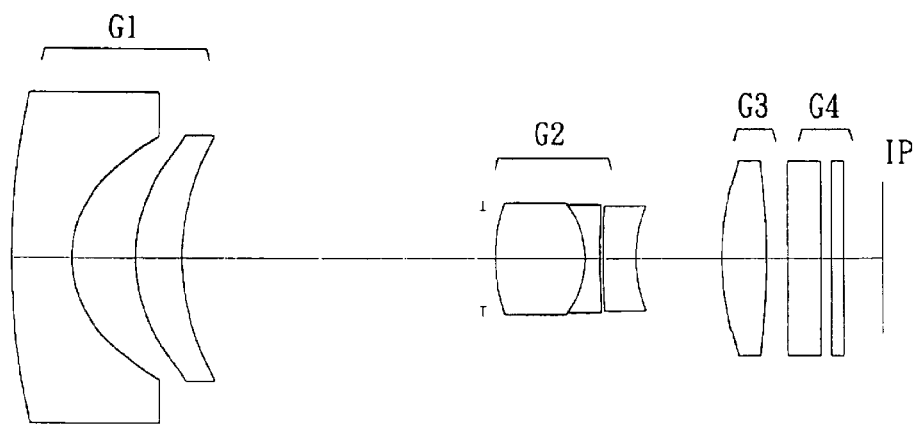
F I G. 17
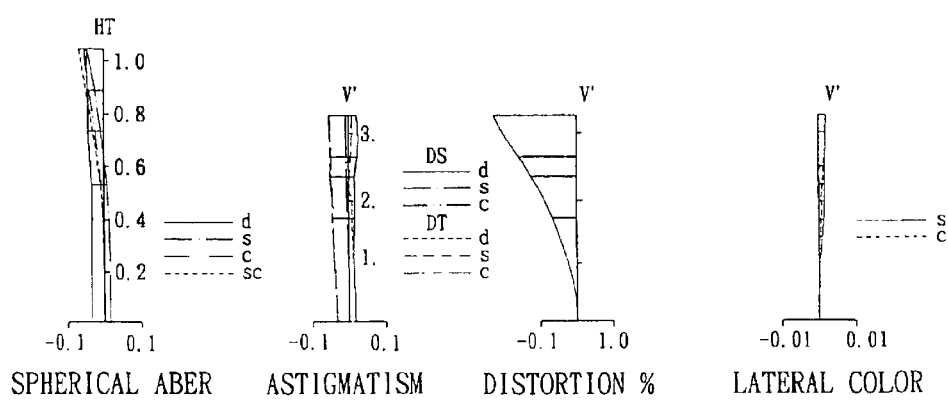
F I G. 18

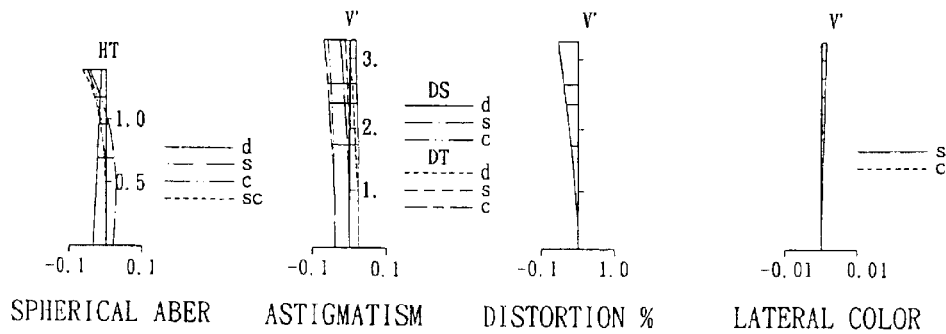
F I G. 19
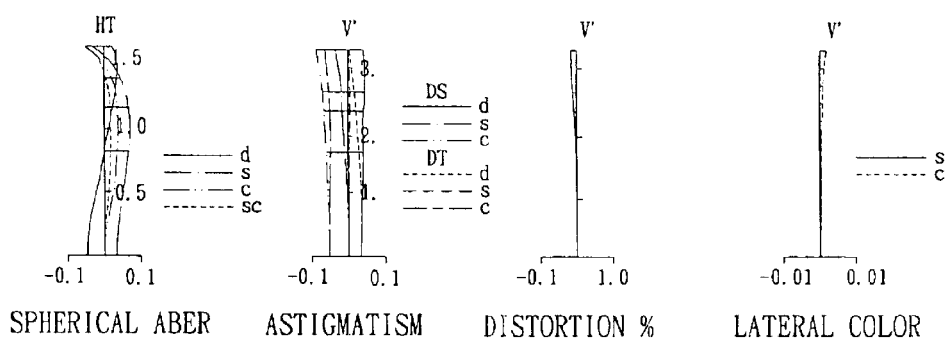
F I G. 20

ZOOM LENS ASSEMBLY

FIELD OF THE INVENTION

The present invention relates to a lens assembly which is used with Charge Coupled Device (CCD) in video cameras and digital still camera, and more particularly, to a zoom lens assembly.

BACKGROUND OF THE INVENTION

It is a requirement from the customers for a video camera or/and digital camera to have a compact size and high quality of resolution. A zoom lens assembly is therefore a basic requirement for the products. If the main beam of light coming from the object is not perpendicular to the lens assembly, for the cambers that employ a square pixel to form an image, can only obtain an image that has low illumination on the periphery, the color changed slightly and/or vignetting of the image simply by using the zoom lens assembly and the efficient of CCD. This is the main factor that makes the lens assembly to be complicated. It is a goal for the manufacturers to have a tele-centric that has a parallel beam of light with the light axis when the light comes from the object.

The cameras that use the charge coupled device (CCD) and a low pass filter lens or color compensation filter lens is installed between the rear end of the lens assembly and the CCD so as to prevent astigmatism of the image and reduce the deformation of the colors of the light sensing feature of the CCD. The back focal length (BFL) for these lens assembly is longer than the conventional so that the above feature is necessary. Conventional zoom lens assembly having the feature includes a first group of lens that has negative power and a second group of lens that has positive power and a third group of lens that has positive power. This technology may zoom in and out up to 2 to 3 times of the ratio of the image.

Japanese published patent H3-288113 tries to improve the shortcoming of the conventional lens assembly and makes the first group of lens to be a fixed one. In order to let the image to be focusing, the diameter of the first lens has to be increased so that the number of the lens is increased and the tele-centric is increased.

Another Japanese published patent H10-104518 includes three groups of lens that are negative power, negative power and positive power. The second group is made of four lenses of positive, gluing, and positive. This allows the lens assembly to have three times of zoom-in and zoom-out ability. Nevertheless, there are so many problems such as the diameters of the lens, the length of the tele-centric and the sensitivity of de-center of the second group of lens, to be settled when in mass production.

Japanese published patent 2000-8911 discloses a lens assembly composed of three lenses which are negative, negative and positive. The second group of lens is composed of three lenses which are positive, negative, and positive. Although the number of the lenses is reduced, the diameter and the character of the de-center are not improved.

Japanese published patent 2001-318311 discloses a lens assembly composed of three lenses which are negative, negative and positive. The second group of lens is composed of three lenses which are positive, glued negative and positive. Although the length of the tele-centric is shortened and the character of the de-center is not improved, the diameter cannot be reduced.

Japanese published patent 2001-281545 discloses a lens assembly composed of two lenses wherein the first group of lens comprises two lenses which are a negative and a positive lens, and the second group of lens is composed of four lenses which are glued positive and negative lens, and glued negative and positive. Although slim of the first group of lens reduces the diameter of the lens assembly and the length of the tele-centric, the number of lens for the second group of lens is not satisfied.

SUMMARY OF THE INVENTION

The primary object of the present invention is to provide a zoom lens assembly that can zoom in and out three times and the second group of lens is compact and its number of lens and the thickness on the axis of the lens are reduced.

The sequence of the lenses, from the object side, is the first group of lens having negative power, the second group of lens having positive power, and the third group of lens having positive power. The distance between the first group of lens and the second group of lens is reduced when the focus changes from zoom-out to zoom-in, and the gap between the second group of lens and the third group of lens is widened. The first group of lens comprises a meniscus lens which has a convex surface facing the object. The second group of lens comprises the glued lens with positive power and meniscus lens with its convex surface facing the object. The third group of lens comprises a bi-convex lens. The focal length of the meniscus lens of the second group of lens is f2n and the when the focal length of the whole second group of lens is f2, it meets the condition: $1.0 < |f2n/f2| < 2.2$. When the Abbe number of the meniscus lens of the second group of lens is V2n, it meets the condition: $35 < V2n < 58$. The meniscus lens of the second group of lens that faces the object becomes an aspheric lens with less negative power when the meniscus lens moves toward periphery. The meniscus lens of the first group of lens that faces the image becomes an aspheric lens with less negative power when the meniscus lens moves toward periphery.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 1 shows a first preferred embodiment of the lens assembly of the present invention;

FIGS. 2–4 show the aberration of the Wide/Middle/Tele of the first preferred embodiment of the lens assembly of the present invention;

FIG. 5 shows a second preferred embodiment of the lens assembly of the present invention;

FIGS. 6–8 show the aberration of the Wide/Middle/Tele of the second preferred embodiment of the lens assembly of the present invention;

FIGS. 14–16 show the aberration of the Wide/Middle/Tele of the fourth preferred embodiment of the lens assembly of the present invention;

FIG. 17 shows a fifth preferred embodiment of the lens assembly of the present invention, and FIGS. 18–20 show the aberration of the Wide/Middle/Tele of the fifth preferred embodiment of the lens assembly of the present invention.

DETAILED DESCRIPTION OF THE PREFERRED EMBODIMENT

Figure 3:
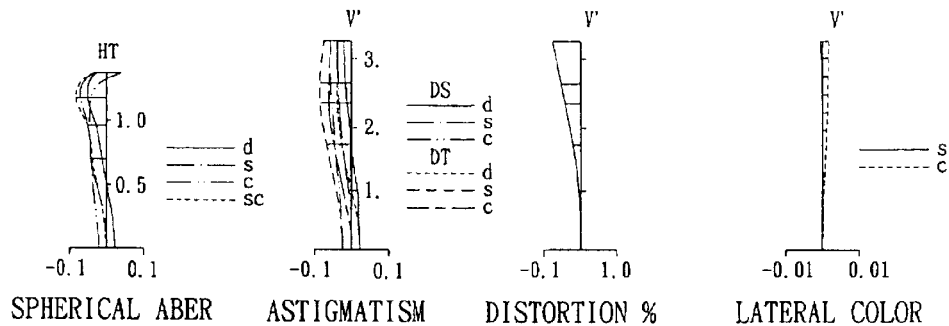
Figure 4:
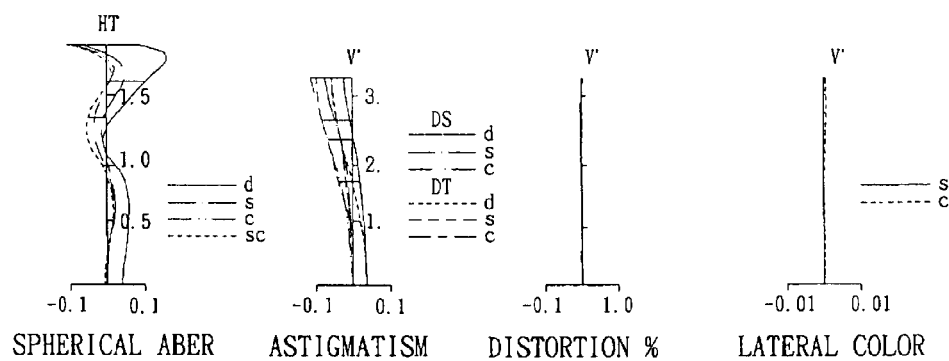
Figure 9:
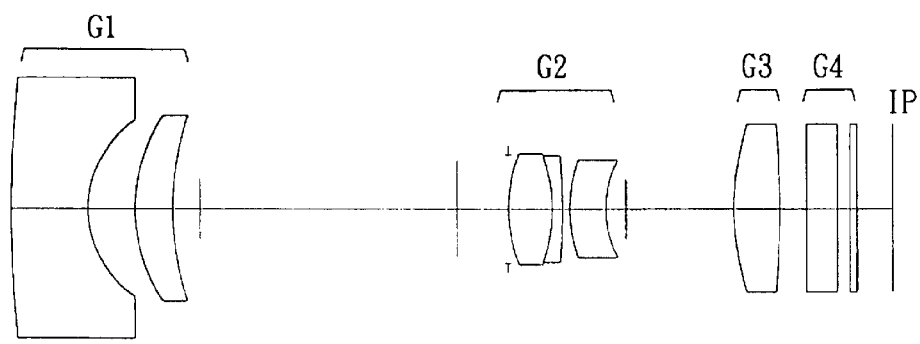
FIG. 9 shows a third preferred embodiment of the lens assembly of the present invention.
Figure 10:
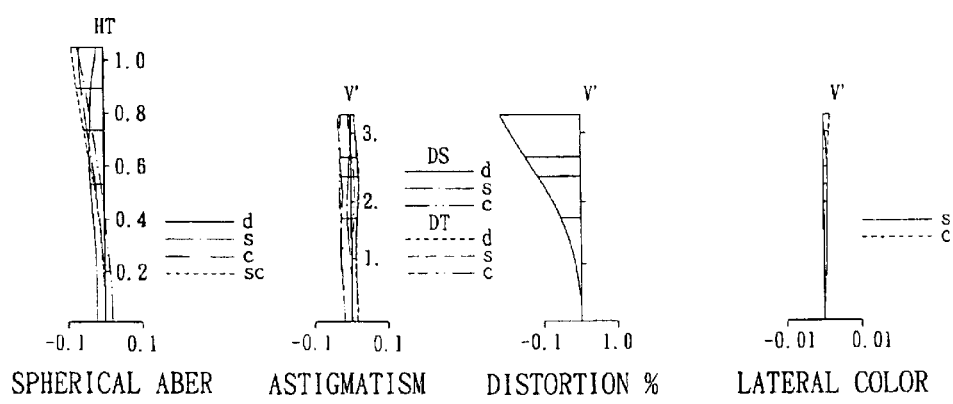
FIGS. 10–12 show the aberration of the Wide/Middle/Tele of the third preferred embodiment of the lens assembly of the present invention.
Figure 11:
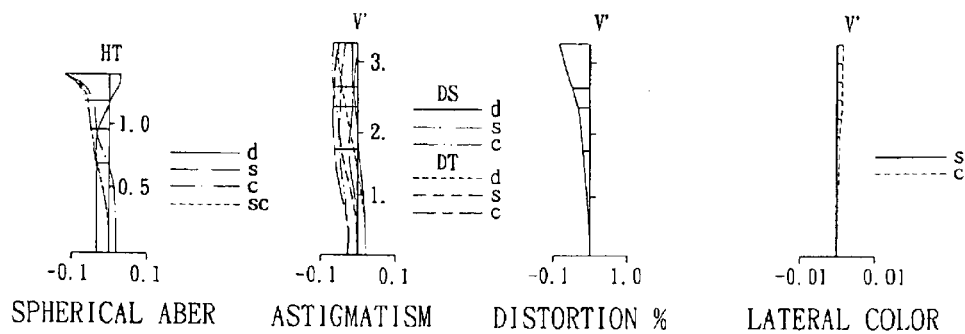
Figure 12:
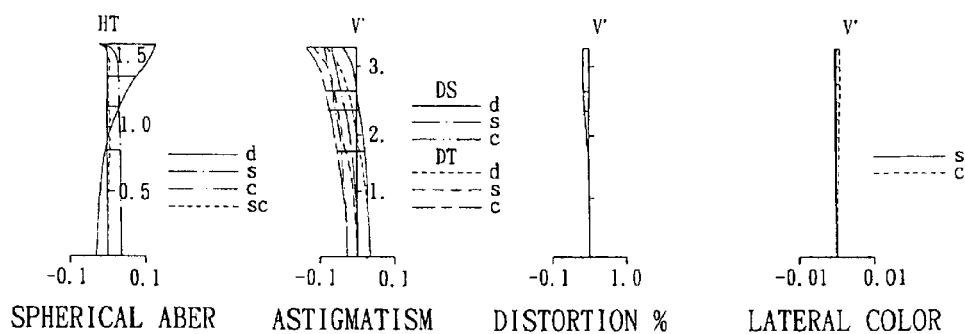
Figure 13:
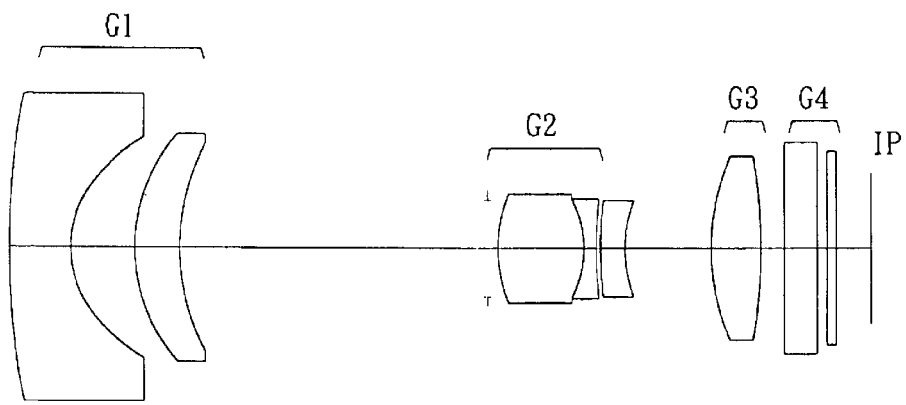
FIG. 13 shows a fourth preferred embodiment of the lens assembly of the present invention.
Figure 14:
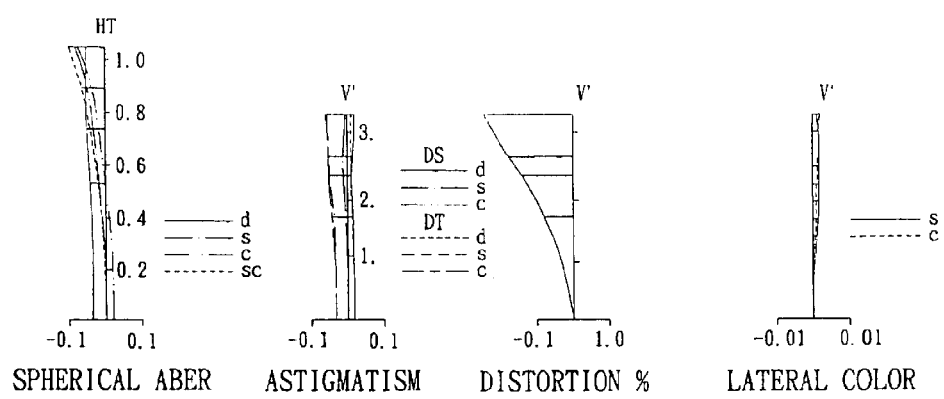

Referring to the attached drawings which shows the data of each embodiment of the present invention. In FIGS. 1, 5, 9, 13, and 17, G1 is the first group of lens that has negative power, G2 is a second group of lens that has positive power, G3 is a third group of lens that has positive power, G4 is a glass block of low pass filter lens or color compensation lens. When the arrowhead prescribes from the Wide mold to Tele mold, the traces of the G1, G2 and G3 are disclosed.

In FIGS. 1, 5, 9, 13, and 17, the first group of lens G1 having negative power is composed of a negative meniscus lens that has a convex surface that faces the object, and a positive meniscus lens that has a convex surface facing the object. The second group of lens G2 having positive power, from the object side, includes a positive power glued lens of a positive lens and a negative lens, and a negative meniscus lens whose convex surface faces the object. The third group of lens having positive power is a lens composed of two convex lenses.

The first group of lens is the same as an ordinary wide-angle lens and is equipped with negative lens and a positive lens so as to reduce the diameter of the front lens. This arrangement reduces the inflexion of the beam of light off the axis. For the in-coming direction of the light, the negative meniscus lens and the positive meniscus lens are used to compress the astigmatism and distortion.

The astigmatism and distortion of the surface facing the image of the negative meniscus lens are compensated when the negative meniscus lens moves toward periphery and becomes an aspheric lens with less negative power. The first group of lens G1 is composed of only two lenses so that the whole lens assembly can be compact.

In order to reduce the chromatic aberration, the second group of lens G2 is composed of a positive lens and a negative lens which is glued to the positive lens, and a meniscus lens which has a convex surface facing the object. The Abbe number of the negative meniscus lens is V2n and meets the requirement of 35<V2n<58, the axial chromatic aberration and lateral color can be well compensated.

If the criteria goes above the upper limit, the chromatic aberration on the axis will be increased so that the compensation of the chromatic aberration and lateral color on the axis is too much and flare is obvious, especially for the short waves. If the setting is within the range, the chromatic aberration on the axis is based on the line "d" and the line "g" and "f" will have the same volume. In other words, the spectrum is the smallest, and the lateral color is compensated as expected. The light passes the second group of lens G2 and the glued lens and the following negative meniscus lens that has a convex surface facing the object. The aspheric surface with less negative power accompany with the movement toward periphery contribute the spherical aberration and coma.

In order to shorten the lens assembly, the second group of lens G2 glues the lens with positive power and a meniscus lens with negative power, which is used for telephoto type. The position of first principle point of the second group of lens G2, is far away from the image. The focal length of the second group is f2 and the focal length of the meniscus lens is f2n, with the match of the criteria of 1.0<|f2n/f2|<2.2., the result is improved.

When the power increased and the criteria goes above the upper limit, the feature of the telephoto type of the second group of lens G2 is reduced and the main point position of the second group of lens G2 moves toward the image (IP), this results in increment of the length of the lens assembly and which is not good. If the criteria goes beyond the smallest limitation, the power increases and the image is deformed and become large suddenly so that the final image is not satisfied. If the change is made in the range of the criteria and the power is happened evenly, the length of the lens assembly can be shortened.

The third group of lens G3 is composed of two convex lenses with positive power. Not only the light coming into the lens assembly from the image position (IP), the telecentric has parallel beam of light with the optical axis. The light passing through the lens assembly is parallel with the optical axis. This also increases the optical feature on the peripheral position.

By the lens assembly of the present invention, the first group of lens G1 may obtain good optical feature when the object is close to the lens assembly.

The focusing can be better when moving the third group of lens G3. If a motor is equipped for driving the first group of lens G1, the barrel of the camera becomes bulky. Besides, the motor is required to output much more force to drive the first group of lens. Therefore, if the adjustment of focus is made by moving the third group of lens, the barrel of the camera does not become bulky. The diameter of the third group of lens is small so that it is light in weight and this reduces the burden for the motor. There is only a zoom cam connected between the first group lens G1 and the second group lens G2 when the first group of lens is not chosen to proceed the adjusting of the focus, this is benefit for the precision and structure of the camera.

R: the radius of curvature of each of the lenses;
D: the thickness or the gap between two lenses;
V: the Abbe number of the material of the lenses;
A, B, C, D, E are coefficients of aspheric surface
H: the height from the optical axis;
X: the change of the direction of the optical axis.
We may have the following equation:

$$X = (1/R)H^2/[1+[1-(1+K)(H/R)^2]^{1/2}] + A(H^4) + B(H^6) + C(H^8) + D(H^{10}) + E(H^{12})$$

R is radius of paraxial region
K is conic coefficient
^2 means exponent or index is 2
^4 means exponent or index is 4
^6 means exponent or index is 6
^8 means exponent or index is 8
^10 means exponent or index is 10
^12 means exponent or index is 12
The criteria is 1.0<|f2n/f2|<2.2.
The value of |f2n/f2| is 1.44 for the first embodiment.
The value of |f2n/f2| is 1.20 for the second embodiment.
The value of |f2n/f2| is 1.13 for the third embodiment.
The value of |f2n/f2| is 1.88 for the fourth embodiment.
The value of |f2n/f2| is 2.06 for the fifth embodiment.
The criteria is 35<V2n<58.
The value of Vn2 is 40.9 for the first embodiment.
The value of Vn2 is 40.9 for the second embodiment.
The value of Vn2 is 40.9 for the third embodiment.

The value of Vn2 is 55.2 for the fourth embodiment.

The value of Vn2 is 55.2 for the fifth embodiment.

While we have shown and described the embodiment in accordance with the present invention, it should be clear to those skilled in the art that further embodiments may be made without departing from the scope of the present invention.

Attachment 1: the data of each embodiment of the present invention

First group of lens: G1 Second group of lens: G2

Third group of lens: G3

Filter: G4

Image plane: IP d line: d g line: g c line: c sine criteria: sc

The perpendicular plane of the Sagittal plane and the meridional image surface involving the main beam of light: DS The image plane obtained by the Meridional image surface and the beam of light of Meridional: DT The height of the image: Y'

The height of the light on the optical axis.

What is claimed is:

1. A lens assembly comprising:

A first group of lens having negative power, a second group of lens having positive power, and a third group of lens having positive power arranged in sequence from an object side, a gap between the first group of lens and the second group of lens being reduced and a gap between the second group of lens and the third group of lens being widened when Wide mode changed to Tele mode, the first group of lens having a negative meniscus lens with a convex surface facing the object side and a positive meniscus lens with a convex surface facing the object side, the second group of lens having positive glued-lenses and a negative meniscus lens with a convex surface facing the object side, the third group of lens having a bi-convex lens.

2. The lens assembly as claimed in claim 1, wherein the negative meniscus lens has a surface which faces the object and becomes an aspheric surface when the lens moves toward the periphery.

3. The lens assembly as claimed in claim 1, wherein the negative meniscus lens of the first group of lens has a surface facing the image plane and becomes an aspheric surface when the lens moves toward the periphery.

* * * * *